(12) United States Patent
Berge et al.

(10) Patent No.: US 7,515,350 B2
(45) Date of Patent: Apr. 7, 2009

(54) LENS OF VARIABLE FOCAL LENGTH

(75) Inventors: Bruno Berge, Lyons (FR); Jérôme Peseux, Solaize (FR); Frédéric Laune, Villefontaine (FR)

(73) Assignee: Varioptic S.A., Lyons (FR)

( * ) Notice: Subject to any disclaimer, the term of this patent is extended or adjusted under 35 U.S.C. 154(b) by 159 days.

(21) Appl. No.: 11/284,125

(22) Filed: Nov. 22, 2005

(65) Prior Publication Data
US 2006/0126190 A1 Jun. 15, 2006

(30) Foreign Application Priority Data
Nov. 24, 2004 (FR) ................................. 04 52747

(51) Int. Cl.
*G02B 3/12* (2006.01)
(52) U.S. Cl. ..................... 359/666; 359/665
(58) Field of Classification Search .......... 359/665–666
See application file for complete search history.

(56) References Cited

U.S. PATENT DOCUMENTS

| 6,188,525 | B1 | 2/2001 | Silver | |
|---|---|---|---|---|
| 6,369,954 | B1 | 4/2002 | Berge et al. | |
| 2004/0228003 | A1* | 11/2004 | Takeyama et al. | 359/666 |
| 2005/0002113 | A1 | 1/2005 | Berge | |
| 2006/0176574 | A1* | 8/2006 | Tukker et al. | 359/665 |
| 2006/0274425 | A1* | 12/2006 | Kuiper et al. | 359/665 |
| 2006/0279848 | A1* | 12/2006 | Kuiper et al. | 359/666 |
| 2006/0285220 | A1* | 12/2006 | Van As et al. | 359/665 |
| 2007/0146893 | A1* | 6/2007 | Kuiper et al. | 359/666 |
| 2008/0231965 | A1* | 9/2008 | Weekamp | 359/666 |
| 2008/0259463 | A1* | 10/2008 | Shepherd | 359/666 |

FOREIGN PATENT DOCUMENTS

| JP | 2002-162506 A | 6/2002 |
|---|---|---|
| JP | 2003-029005 A | 1/2003 |
| JP | 2003-057409 A | 2/2003 |
| WO | WO 2004-099847 A1 | 11/2004 |

OTHER PUBLICATIONS

B. Berge et al., "Variable Focal Lens Controlled by an External Voltage: An Application of Electrowetting," European Physical Journal E. Soft Matter, EDP Sciences, IT, vol. 3, No. 2, Oct. 2000, pp. 160-163.

S. Kuiper et al., "Variable-Focus Liquid lens for Portable Applications," Proceedings of the SPIE, vol. 5523, No. 1, Aug. 4, 2004, pp. 100-109.

* cited by examiner

*Primary Examiner*—Jordan M. Schwartz
(74) *Attorney, Agent, or Firm*—Osha • Liang LLP

(57) ABSTRACT

A lens assembly of variable focal length comprises two transparent plates (24, 38) at least partially facing each other and parallel to one another and delimiting, at least in part, an internal volume (15) containing two non-miscible liquids having different optical indices. The lens comprises an elastic element (36) capable of deforming in response to a change in pressure of the liquids, in such a way as to substantially maintain the optical properties of the lens assembly, e.g., in order to maintain the parallelism of the two transparent plates.

35 Claims, 2 Drawing Sheets

LENS OF VARIABLE FOCAL LENGTH

CROSS-REFERENCE TO RELATED PATENT APPLICATIONS

France Priority Application 04/52747, filed Nov. 24, 2004 including the specification, drawings, claims and abstract, is incorporated herein by reference in its entirety.

FIELD OF THE INVENTION

The present invention relates to lenses of variable focal length and more particularly to such lenses employing the deformation of a drop of liquid through electrowetting phenomena.

BACKGROUND OF THE INVENTION

Various embodiments of lenses of variable focal length are described in commonly owned European Patent No. 1,166, 157. FIG. 1 of the current application is similar to FIG. 12 of that patent. A cell is defined by two transparent insulating plates 1 and 2 and side walls (not depicted). The lower plate 2, which is non-planar, comprises a conical or cylindrical depression or recess 3, of axis Δ, which contains a drop of an insulating liquid 4. The remainder of the cell is filled with an electrically conductive liquid 5, non-miscible with the insulating liquid, having a different refractive index and essentially the same density. An annular electrode 7, which is open facing the recess 3, is positioned on the rear face of the lower plate 2. Another electrode 8 is in contact with the conductive liquid 5. Through electrowetting phenomena it is possible to modify the curvature of the interface between the two liquids, according to the voltage V applied between the electrodes 7 and 8. For example, the curvature changes from the concave initial shape denoted by the reference A to the convex shape depicted in dotted line and denoted by the reference B. Thus, a beam of light passing through the cell normal to the plates 1 and 2 in the region of the drop 4 will be focused to a greater or lesser extent according to the voltage applied. The conductive liquid is typically an aqueous liquid, and the insulating liquid is typically an oily liquid.

The mount for the lens formed by the transparent plates 1, 2 and the side walls connecting the transparent plates generally constitutes a rigid structure. The pressure of the liquids in the lens mount may increase substantially, for example, during operations of assembling the parts that make up the mount or, once the mount has been assembled, when the liquids of the lens, which have coefficients of expansion higher than the coefficients of expansion of the materials of which the mount is made, are subject to temperature increases.

An excess of pressure of the liquids contained in the lens carries the risk of causing deformation of the upper and lower transparent plates 1, 2, resulting in undesirable optical distortion. At worst, if the liquid pressure increase is too great, it may cause the transparent plates 1, 2 to rupture. It is therefore necessary to take precautions when assembling the lens and/ or to limit the permissible temperature range for storage and use of such a lens.

SUMMARY OF THE INVENTION

One object of the present invention is to provide a lens of variable focal length that has optical properties which are not disturbed during assembly, storage and/or use of the lens by a variation in the pressure of the liquids contained within the lens.

A further object of the invention resides in providing a method for manufacturing such a variable focal length lens.

In accomplishing these and other objectives, there has been provided according to one aspect of the present invention a variable focal length lens assembly having an optical axis, comprising: two transparent members that at least partially face each other and are arranged parallel to one another and that delimit at least in part an internal volume containing two non-miscible liquids that have different optical indices and define an interface; and a wall surrounding one of the transparent members and partially delimiting the internal volume, the wall including an elastic member that comprises a non-linear portion capable of deforming in response to a change in pressure of the liquids in such a way as to substantially maintain the optical properties of the lens assembly.

In accordance with another aspect of the present invention, there has been provided a method of manufacturing a lens assembly of variable focal length and having an optical axis, the lens assembly comprising first and second transparent members at least partially facing each other and parallel to one another, and delimiting, at least in part, an internal volume containing a conducting and an insulating liquid that are non-miscible, have different optical indices and define an interface, the lens assembly further comprising an elastic member capable of deforming in response to a change in pressure of the liquids, wherein the method comprises: providing a cap having symmetry of revolution about an axis, through the central part of which there passes a cylindrical opening and being extended by a first cylindrical side wall, a first one of the transparent members being sealed to the cap to cover the opening; providing a body through the central part of which there passes a second cylindrical opening and being extended by a second cylindrical side wall of a diameter smaller than the diameter of the first cylindrical wall, the second transparent member being sealed to the body to cover the opening; positioning a sealing member between the first and second cylindrical side walls; filing the internal volume with the two liquids; and positioning and sealing the cap onto the body after the internal volume is filled with the two liquids.

In accordance with another aspect of the present invention, there is provided an optical device including a lens assembly of variable focus length as defined above, and particularly a mobile telephone apparatus embodying the optical device according to the invention.

Further objects, features and advantages, of the present invention will become apparent from the following detailed description of a specific exemplary embodiment, given non-limitingly in conjunction with the accompanying figures of drawing.

DETAILED DESCRIPTION OF THE PREFERRED EMBODIMENTS

According to one embodiment of the invention, there is provided a structure of a lens with, an elastic element capable of deforming, preferably in response to variations in the pressure of the liquids contained in the lens, such that the deformation of the element has little or no influence on the optical properties of the lens. Thus, any deformation of parts which contribute to the optical properties of the lens is limited, thereby ensuring that the lens maintains its optical properties when the lens/lens mount is being assembled and when the lens is being used.

Figure 2:
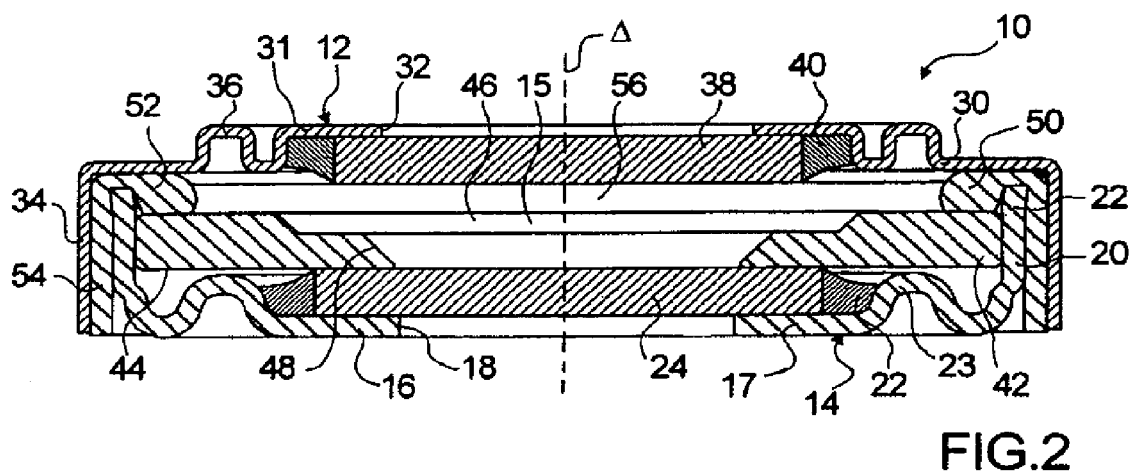
FIGS. 2 and 3 are cross-sectional views taken through an exemplary embodiment of a lens of variable focal length according to the invention, at two successive steps in the method of manufacturing the lens.

FIG. 2 depicts an exemplary embodiment of a mount for the lens of variable focal length according to the invention, at an intermediate step in the method of manufacturing the lens/mount assembly. The mount 10 for a lens of variable focal length according to the invention is made up of an upper part 12 and of a lower part 14 which are produced separately from one another and which, when assembled, define an internal volume 15 containing the insulating and conducting liquids (not depicted). The terms "upper" and "lower" are with reference to the drawings only, inasmuch as the lens/mount assembly can take any orientation during use. The lower part 14 comprises a body 16 preferably having symmetry of revolution about the axis Δ, for example, a body made of steel, comprising a base 17 through which there passes a central opening 18, and which continues in the form of a cylindrical lateral portion 20 which ends in a frustoconical rim 22. The base 17 of the body 16 preferably comprises a wavy portion 23, preferably also exhibiting symmetry of revolution about the axis Δ, e.g., wherein the cross section taken along a plane containing the axis Δ has the shape (approximately) of an "S". A cylindrical member, such as a plate 24 made of a transparent material, for example, of glass, covers the opening 18 by being interposed between the internal volume 15 of the mount 10 and opening 18, and is fixed to the lower body part 16 by any suitable fixing material 22, for example, a welding glass or any other type of adhesive.

The upper part 12 of the mount 10 comprises a cap 30, through the central part of which there passes a cylindrical opening 32 and which is extended by a cylindrical side wall 34, the diameter of which is greater than the diameter of the cylindrical wall 20 of the body 16. The cap 30 comprises an elastic portion 36 provided between the opening 32 and the cylindrical side wall 34.

In the embodiment of FIG. 2, the elastic portion 36 consists of a wavy portion exhibiting symmetry of revolution about the axis Δ and of which the cross section on a plane containing the axis Δ has the shape (approximately) of an "S".

A cylindrical plate 38, made of a transparent material, for example, of glass covers the opening 32, by being interposed between the opening 32 and the internal volume 15 of the mount 10, and is fixed to the cap 30 by any suitable fixing material 40, for example, glass or an adhesive.

Advantageously, the cap comprises an upper wall 31 connected to the transparent plate 38 and the cylindrical side wall 34, and the upper wall comprises non-linear portions 36 with symmetry of revolution about the optical axis (Δ) of the lens. For example, the cap can be made of a stamped metal, e.g., in stainless steel. The thickness of the upper wall of the cap will depend on the expected variations of volume to compensate for the effects of expansion of the liquids. For example, a typical thickness of about 0.1 to 0.25 mm has shown good results for lenses whose outer diameter is below about 20 mm.

The cylindrical plate 38 is used as a window for covering the opening 32. According to one variant of the invention, the window can be a fixed lens made of a transparent optical material.

In this preferred embodiment, an intermediate piece 42 is positioned on or in the base 17 of the body 16, so that it lies between the internal volume 15 and base 17. The intermediate piece 42 comprises a planar face 44 resting at least in part against the glass plate 24, and through it there passes an opening 46 defining a conical surface 48 adjacent to the glass plate 24. The intermediate piece 42 can be, for example, made of stainless steel and covered with an insulating layer, at least on its faces in contact with the conducting liquid contained in the mount 10. During use of the lens, the edge of the interface between the conducting liquid and the insulating liquid, both contained in the internal volume 15, moves along the frustoconical surface 48, with the insulating liquid wetting the glass plate 24. Preferably, the roughness of the conical surface 48 is defined by a roughness parameter Ra (arithmetic mean deviation) of less than 0.1 μm in order to provide better control over the movements of the interface between the two liquids. In order to obtain such a roughness value, the production of the conical surface 48 preferably involves a surface-finishing process, for example, of the abrasion polishing (tribofinishing), electrolytic polishing or diamond-point machining type.

A gasket 50 is positioned between the body 16 and the cap 30 at the peripheral of the lower body part 16 and of the cap 30. The gasket 50 comprises a toric portion 52 extended via a skirt portion 54. By way of example, the gasket 50 can be made of fluorosilicone or of ethylene propylene diene (EPDM) terpolymer, or of FKM which is the standardized term for a fluorinated polymer of the Viton type (Viton is a trade name of Dupont Dow Elastomers). More generally, the material of which the gasket 50 is made has a low absorption with respect to the liquids contained in the internal volume 15 of the mount 10, and this also contributes to maintaining the dielectric properties of the lens.

The manufacture of a mount 10 for a lens assembly according to the invention begins with the separate manufacture of the upper 12 and lower 14 parts. The plate 24 is fixed to the lower body part 16. The intermediate piece 42 is then fixed to the lower body part 16, for example, as a crimped fitting in order to obtain good electrical contact between the intermediate piece 42 and the lower body part 16. Furthermore, a sealing element or measure is provided between the intermediate piece 42 and the glass plate 24. This may involve an earlier deposition of a layer of polymer on the planar face 44 of the intermediate piece 42 and/or on the glass plate 24, for example, of a curable adhesive. The gasket 50 is positioned at the lower body 16, with the toric portion 52 resting against the intermediate piece 42 and the skirt portion 54 surrounding the cylindrical side wall 20 of the lower body 16. The frustoconical rim 22 of the body 16 assists with holding the gasket 50 on the lower body 16 before the cap 30 is fitted.

The lower part 14, associated with the gasket 50, is then immersed in the conducting liquid. A drop of the insulating liquid is placed in contact with the glass plate 24 and with the conical surface 48. The placement of the insulating liquid may be facilitated by providing, at the surface of the glass plate 24 intended to come into contact with the insulating liquid, a layer of a material which has a tendency to be preferentially wetted with the insulating liquid rather than with the conducting liquid. Typical examples are TEFLON or AF 1601, available from DuPont. The cap 30 is then positioned on the gasket 50, the skirt portion 54 of the gasket 50 being interposed between the side wall 34 of the cap 30 and the side wall 20 of the body 16. This then more or less yields the mount 10 for the lens depicted in FIG. 2 (without showing the liquids). The steps of positioning the upper part 12 on the lower part 14 are advantageously performed in a liquid environment so as to limit the risk of air entering into the internal volume 15 of the mount 10.

In the embodiment of FIG. 2, the portion 52 of the gasket compressed between the cap and the intermediate piece 42 is toric, but other shapes are possible for the portion 42. For example, the section of said portion of the gasket could be rectangular or of any other shape.

Figure 3:
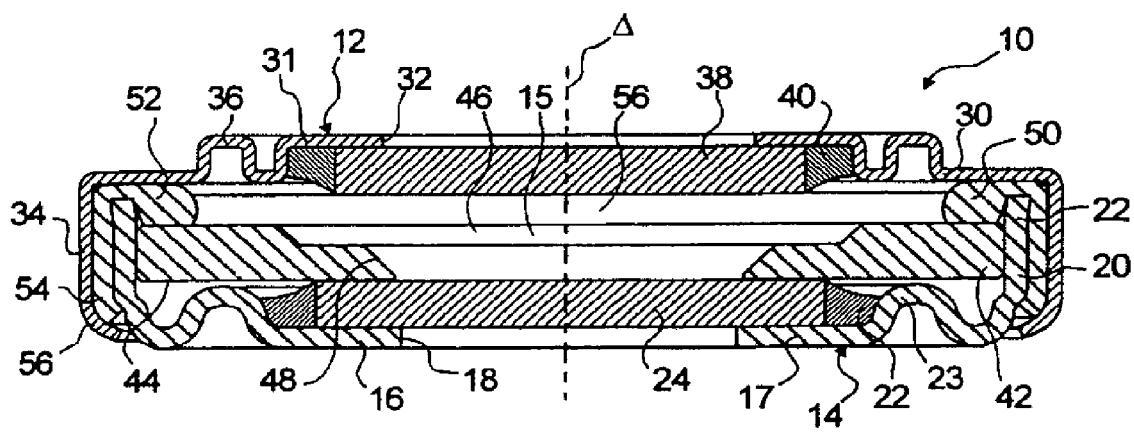

The last step in the manufacture of the mount 10 involves crimping the free rim of the side wall 34 of the cap 30 onto the lower body 16, at the same time compressing the toric portion 52 of the gasket 50 between the cap 30 and the intermediate piece 42. By way of example, the cap 30 is crimped onto the lower body 16 by controlling the compression force exerted on the gasket 50. This then yields the structure as depicted in FIG. 3, in which the lateral portion 34 of the cap 30 comprises an end portion 56 crimped onto the lower body 16. The skirt portion 54 of the gasket 50 is therefore compressed between the side wall 34 of the cap 30 and the side wall 20 of the body 16. Sealing of the internal volume 15 of the mount 10 is therefore afforded by the compression of the toric portion 52 and the compression of the skirt portion 54 of the gasket 50.

Figure 1:
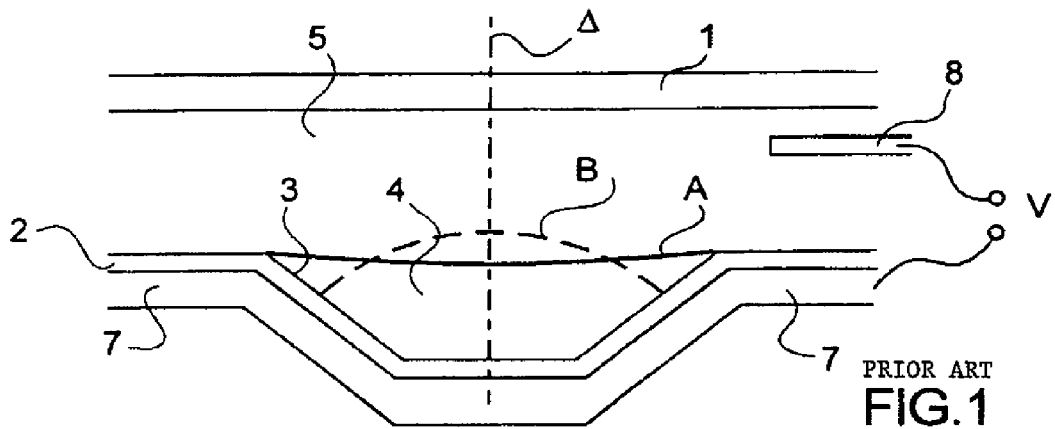
FIG. 1 is a cross-sectional view taken through a conventional exemplary embodiment of a lens of variable focal length.

By comparison with the structure as depicted in FIG. 1, the upper electrode of the lens consists of the cap 30 and the lower electrode consists of the lower body 16 in electrical contact with the intermediate piece 42. The gasket 50 therefore also provides electrical insulation of the cap 30 with respect to the lower body 16.

According to the presently described exemplary embodiment of the mount 10 for a lens assembly according to the invention, the elastic means described previously corresponds to the elastic portion 36 of the cap 30. Specifically, if the pressure in the internal volume 15 of the mount 10 rises, the elastic portion 36 provided at the cap 30 deforms preferentially in comparison with the other parts of the mount 10. The stresses exerted on the transparent cylindrical plates 24, 38 are therefore lessened, thus avoiding any risk of the plates 24, 38 deforming or rupturing. Since the plates 24, 38 are not deformed, the optical power of the lens remains constant. There is therefore no variation in the focal length of the lens.

As the elastic portion 36 deforms, there may be some relative displacement of the transparent plate 38 with respect to the transparent plate 24. However, the mount is constructed so that such displacement of the transparent plate 38 occurs essentially solely along the axis Δ. Providing symmetry of revolution of the elastic portion 36 is one measure that provides displacement along axis Δ. The parallelism of the two transparent plates 24, 38 is therefore maintained, thus avoiding any deviation of the optical axis of the lens.

The wavy portion 23 provided at the lower body 16 may also be designed to act as an elastic element, but to a lesser extent compared with the elastic portion 36, given that the thickness of the body 16 typically exceeds the thickness of the cap 30. However, the wavy portion 23 may provide a secondary or back-up deformation in the event, for example, of substantial expansions of the liquids contained in the mount 10.

According to one alternate embodiment of the present invention, the elastic element can include auxiliary measures for compensating for variation in internal pressure. For example, an air-filled cavity formed, for example, at the intermediate piece 42 and separated from the internal volume 15 of the mount 10 containing the insulating and conducting liquids by an impermeable and elastic membrane can be employed. A variation in the pressure in the internal volume 15 then results in deformation of the membrane.

According to another alternate embodiment of the present invention, the sealing layer provided between the glass plate 24 and the intermediate piece 42 and the optional layer provided on the inner surface of glass plate 24, encouraging preferential wetting with the insulating liquid over that of the conducting liquid, are one and the same layer.

According to another alternate embodiment of the present invention, provision is made for the material fixing the glass plates to the cap 30 and to the lower body 16, respectively, to be protected by a protective layer, so as to prevent the fixing means from deteriorating in the presence of the liquids that are contained in the internal volume 15 of the mount 10. This, for example, typically involves the provision of a protective layer based on organic materials.

According to still another alternate embodiment of the present invention, once the intermediate piece 42 has been fitted to the lower body 16 in contact with the transparent plate 24, the whole subassembly can be covered with an insulating layer on the side designed to face the internal volume 15 of the mount 10. Any suitable insulating material can be used, e.g., parylene.

According to another alternate embodiment of the present invention, the intermediate piece 42 and the lower body 16 can form a single piece onto which the cap 30 is crimped. This single piece typically comprises a shoulder to accept the transparent plate 24.

Figure 4:
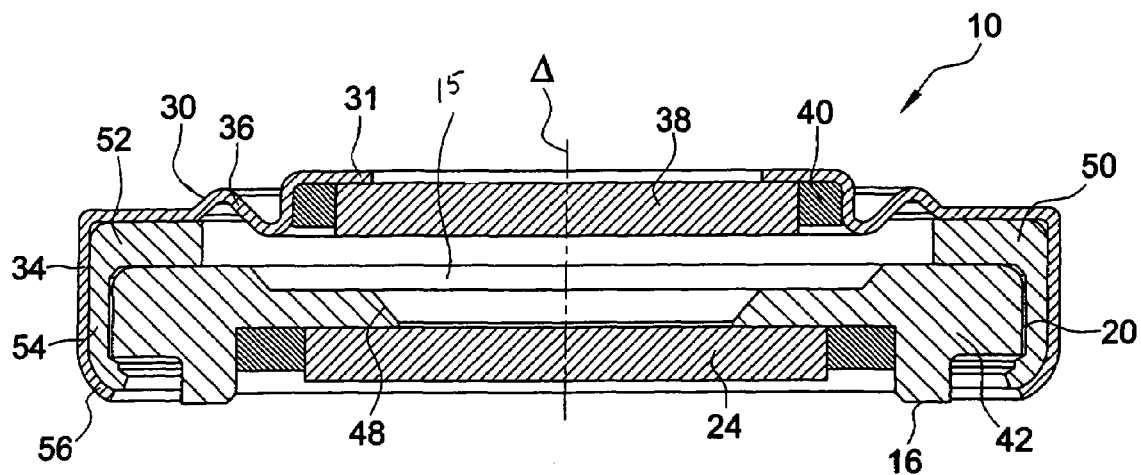
FIG. 4 is a cross-sectional view taken through a further embodiment of a lens assembly according to the invention.

FIG. 4 shows a cross-section of a further embodiment of the lens mount according to the invention. According to this embodiment, and similarly to the embodiment described in FIGS. 2 and 3, the lens mount 10 according to this embodiment of the invention comprises two transparent windows 24, 38 that face each other and are parallel to one another. The two windows delimit, at least in part, an internal volume 15 containing two non-miscible liquids, with different optical indices, defining an interface (not shown in detail in FIG. 4). In FIG. 4, the windows are plates, made in an optically transparent material, e.g., glass. According to a variant, at least one of the windows can be a lens of fixed optical lengths, centered on the optical axis (Δ) of the variable focus lens.

As described previously with reference to FIGS. 2 and 3, the lens mount comprises a cap 30 connected to one of the transparent windows 38 and comprising a first cylindrical side wall 34. The mount also comprises a lower body 16, preferably having a symmetry of revolution, with the axis of revolution defining the optical axis (Δ) of the lens. The lower body is connected to the other transparent window 24 and comprises a second cylindrical side wall 20 of a diameter smaller than the diameter of the first cylindrical wall 34. As previously, the upper electrode comprises the cap 30, and the lower electrode comprises the lower body 16. A gasket 50 is provided to ensure the tightness of the lens mount. It is compressed between the first and second cylindrical side walls. In the embodiment of FIG. 4, the gasket comprises a skirt portion 54 compressed between the first and second cylindrical side walls, and a portion 52 compressed between the cap and an intermediate part 42, forming, in this example, a single piece with the lower body 16, and comprising an opening defining a conical or cylindrical surface adjacent 48 where the interface between the two liquids is able to move.

According to this embodiment of the invention, the lens further comprises an elastic element 36 capable of deforming in response to a change in pressure of the liquids. In this embodiment, the elastic element comprises non-linear, e.g., bent, portions 36 formed on an upper wall of the cap, where the non-linear portions have symmetry of revolution about the optical axis (Δ) of the lens. For example, the bent portions comprise at least one arcuate, preferably circular bend centered on the optical axis (Δ) of the lens. In this example also, the cap can preferably be made of a stamped metal, e.g., stainless steel. The thickness of the upper wall of the cap will depend on the expected variations of volume, in order to compensate for the effects of expansion of the liquids. For example, a typical thickness of about 0.1 to 0.25 mm has shown good results for lenses whose outer diameter is below about 20 mm.

One or more different elastic elements can alternately be provided. For example, an air-filled cavity can be inserted in the lens to compensate for the effects of expansion of the liquids.

In FIG. 4, the first side wall 34 comprises a rim 56 crimped onto the lower body 16 for the sealing of the cap onto the body. Other methods for sealing the cap onto the body are also possible, for example, the cap can be glued onto the body.

The method for manufacturing the lens assembly according to the embodiment described in FIG. 4 can be carried out essentially the same as the method described previously. Advantageously, the method comprises providing separately the cap 30 and the lower body 16, wherein windows 38 and 24 have been sealed to said cap and lower body. Then the gasket 50 is positioned between the first and second cylindrical side walls and the cap is positioned and sealed onto the body after the internal volume has been filled with the two liquids.

According to one alternate embodiment, filling of the internal volume comprises immersing the lower body and the transparent window connected to it into a solution of the conducting liquid, placing a drop of insulating liquid in contact with the transparent window and positioning the gasket on the side wall of the cap, with the body being kept immersed in the conducting solution. Advantageously, sealing the side wall of the cap onto the body is performed with the body being kept immersed in the conducting solution, in order to avoid introducing any air bubbles into the lens.

Thanks to the elastic element provided in the lens, no deformation of the windows will occur that could result from the increase of the pressure of the liquids during manufacturing of the lens.

Advantageously, as shown on FIG. 4, the cap is provided with bent portions having symmetry of revolution about the axis (Δ) to provide the elastic element.

According to an alternate embodiment, an air-filled cavity capable of deforming in response to a change in pressure of the liquids can be inserted in the lens during the manufacture of the lens.

Advantageously, sealing of the cap onto the lower body is performed by crimping the side wall of the cap onto the body, which produces a very good mechanical strength of the mount.

Of course, the present invention can be varied and modified in various ways that will be apparent to the person skilled in the art. In particular, the above-mentioned assembly steps may be modified. By way of example, the introduction of the drop of insulating liquid at the lower part 14 of the mount 10 may be performed before the mount is immersed in the conducting liquid. Other modifications are also possible.

Figure 5:
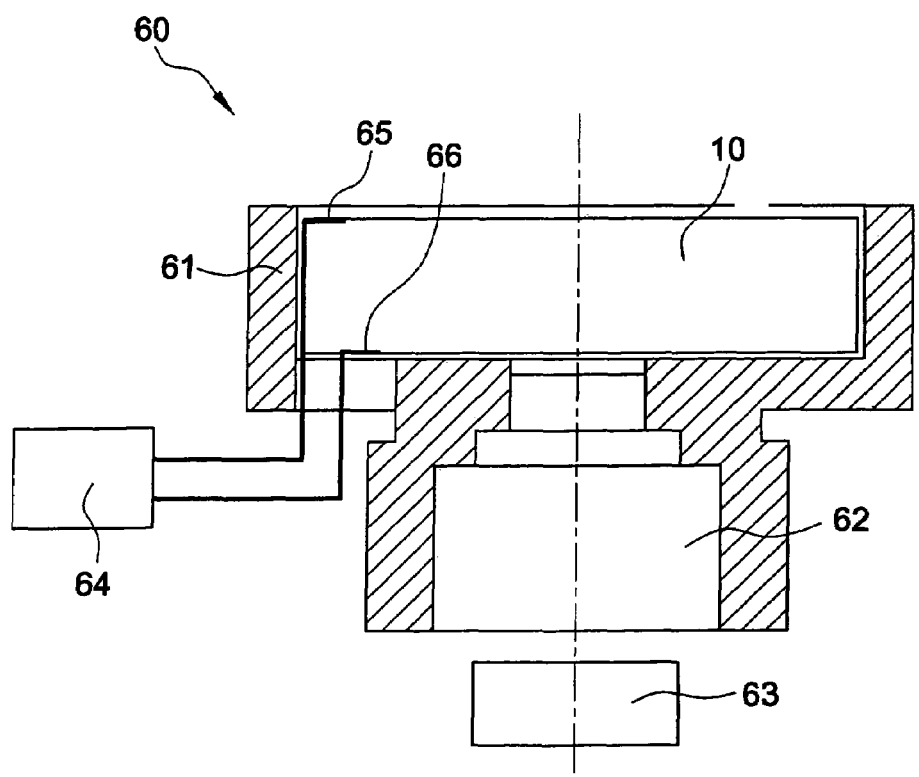
FIG. 5 is a schematic view of an optical device, such as a mobile phone, including a variable focus lens assembly according to the invention.

FIG. 5 is a schematic representation of an optical device 60 incorporating a lens 100 of variable focal length according to the invention. The optical device comprises a mount 61 to hold the variable focus length lens 100 and a set 62 of one or more fixed lenses. It further comprises and optical sensor 63 and a driver 64 for driving the variable lens, with the driver being connected to the electrodes of the lens through the connections 65, 66. A typical optical device is a mobile telephone, e.g., of the type generally described in U.S. Pat. No. 6,823,198, the entire disclosure of which is hereby incorporated by reference.

The optical device lens of variable focal length according to the invention can be incorporated in many systems in which there is a need for miniaturized variable focal length optical devices, such as, for example, mobile phones, endoscope systems, etc.

The foregoing description of preferred embodiments of the invention has been presented for purposes of illustration and description only. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and that the claims encompass all embodiments of the invention, including the disclosed embodiments and their equivalents.

What is claimed is:

1. A variable focal length lens assembly having an optical axis, comprising:
    two transparent members that at least partially face each other and are arranged parallel to one another and that delimit at least in part an internal volume containing two non-miscible liquids that have different optical indices and define an interface;
    a wall partially surrounding one of the transparent members and partially delimiting the internal volume, the wall comprising a non-linear portion capable of deforming in response to a change in pressure of the liquids in such a way as to substantially maintain the optical properties of the lens assembly;
    a cap connected to a first one of the transparent members;
    a body connected to a second one of the transparent members; and
    an intermediate piece, connected to the body or forming a single piece with the body, and comprising an opening defining a conical or cylindrical surface adapted to receive an interface between the two liquids.

2. A lens assembly according to claim 1, wherein the non-linear portion has a symmetry of revolution about the optical axis, whereby parallelism of the two transparent members is substantially maintained upon deformation of the non-linear portion.

3. A lens assembly according to claim 2, in which the non-linear portion comprises at least one circular bend centered on the optical axis.

4. A lens assembly according to claim 1, wherein the cap comprises a first cylindrical side wall, the body comprises a second cylindrical side wall of a diameter smaller than the diameter of the first cylindrical wall, and the lens assembly further comprises a seal member having a first portion compressed between the cap and the intermediate piece and a skirt portion compressed between the first and second cylindrical side walls.

5. A lens assembly according to claim 4, wherein the first portion of the seal member compressed between the cap and the intermediate piece has a toxic shape.

6. A lens assembly according to claim 4, wherein the cap comprises an upper wall connected to said first transparent member and extended by the first cylindrical side wall, the upper wall comprising a non-linear portion with symmetry of revolution about the optical axis.

7. A lens assembly according to claim 6, wherein the cap is made of a stamped metal.

8. A lens assembly according to claim 6, wherein the thickness of the upper wall is about 0.1 to 0.25 mm.

9. A lens assembly according to claim 4, wherein the first side wall comprises a rim crimped onto the body.

10. A lens assembly according to claim 1, further comprising a sealing layer located on at least one side of the second transparent member.

11. A lens assembly according to claim 1, wherein the body and/or the cap is connected to the associated transparent member by a welding glass covered with an organic protective layer.

12. A lens assembly of variable focal length, comprising:
two transparent members that at least partially face each other and are arranged parallel to one another and that delimit at least in part an internal volume containing two non-miscible liquids that have different optical indices and define an interface;
a cap connected to a first one of the transparent members and comprising a first cylindrical side wall;
a body having symmetry of revolution about an axis defining the optical axis of the lens assembly, connected to the second one of the transparent members and comprising a second cylindrical side wall of a diameter smaller than the diameter of the first cylindrical wall;
a sealing member compressed between the first and second cylindrical side walls; and
an elastic member capable of deforming in response to a change in pressure of the liquids.

13. A lens assembly according to claim 12 further comprising an intermediate piece, connected to the body or forming a single piece with the body, and comprising an opening defining a conical or cylindrical surface adapted to receive an interface between the two liquids.

14. A lens assembly according to claim 13, wherein the sealing member comprises a first portion compressed between the cap and the intermediate piece and a skirt portion compressed between the first and second cylindrical side walls.

15. A lens assembly according to claim 13, wherein the surface has a roughness defined by a roughness parameter Ra of less than 0.1 micron.

16. A lens assembly according to claim 12, wherein the first side wall comprises a rim crimped onto the body.

17. A lens assembly according to claim 13, further comprising a sealing layer positioned on at least one side of the intermediate piece.

18. A lens assembly according to claim 12, wherein the body and/or the cap is connected to the associated transparent member by a welding glass covered with an organic protective layer.

19. A lens assembly according to claim 12, wherein the cap comprises an upper wall connected to the first transparent member and extended by the first cylindrical side wall, and the elastic member comprises at least one non-linear portion formed on the upper wall of the cap, having symmetry of revolution about the optical axis.

20. A lens assembly according to claim 19, wherein the at least one non-linear portion comprises at least one circular bend centered on the optical axis.

21. A lens assembly according to claim 19, wherein the cap is made of a stamped metal and the thickness of the upper wall of the cap is about 0.1 to 0.25 mm.

22. An optical device including a lens assembly of variable focus length according to claim 1.

23. An optical device including a lens assembly of variable focus length according to claim 12.

24. A mobile phone including an optical device according to claim 22.

25. A mobile phone including an optical device according to claim 23.

26. A method of manufacturing a lens assembly of variable focal length and having an optical axis, the lens assembly comprising first and second transparent members at least partially facing each other and parallel to one another, and delimiting, at least in part, an internal volume containing a conducting and an insulating liquid that are non-miscible, have different optical indices and define an interface, the lens assembly further comprising an elastic member capable of deforming in response to a change in pressure of the liquids, wherein the method comprises:
providing a cap having symmetry of revolution about an axis, through the central part of which there passes a cylindrical opening and being extended by a first cylindrical side wall, a first one of the transparent members being sealed to the cap to cover the opening;
providing a body through the central part of which there passes a second cylindrical opening and being extended by a second cylindrical side wall of a diameter smaller than the diameter of the first cylindrical wall, the second transparent member being sealed to the body to cover the opening;
positioning a sealing member between the first and second cylindrical side walls;
filing the internal volume with the two liquids; and positioning and sealing the cap onto the body after the internal volume is filled with the two liquids.

27. A method according to claim 26, further comprising:
positioning, in the body, an intermediate piece that includes an opening defining a conical or cylindrical surface for receiving the interface.

28. A method according to claim 26, wherein filling of the internal volume comprises:
immersing the body and the second transparent member connected to it in a solution of a first one of the two liquids that is conducting;
placing a drop of the second one of the two liquids that is insulating in contact with the second transparent member; and
positioning the sealing member and the side wall of the cap, while the body is kept immersed in the conducting liquid.

29. A method according to claim 28, wherein sealing of the cap onto the body is performed with the body being kept immersed in the conducting liquid.

30. A method according to claim 26, further comprising inserting into the internal volume at least one air-filled cavity capable of deforming in response to a change in pressure of the liquids.

31. A method according to claim 26, wherein the elastic member comprises at least one non-linear portion of the cap having a symmetry of revolution about the optical axis.

32. A method according to claim 31, wherein the cap is made of stamped metal.

33. A method according to claim 26, wherein sealing of the cap onto the body comprises crimping the side wall of the cap onto the body.

34. A method of manufacturing a lens assembly of variable focal length comprising two transparent members, comprising:

providing a cap connected to one of the transparent members and comprising a first cylindrical side wall;

providing a body connected to the other of the transparent members and comprising a second cylindrical side wall of a diameter smaller than the diameter of the first cylindrical wall;

positioning the transparent members in such a way that they at least partially delimit an internal volume containing two non-miscible liquids with different optical indices, the two transparent members being at least partially facing each other and parallel to one another;

positioning, in the body, an intermediate piece comprising a conical opening for receiving the interface between the two liquids;

incorporating an elastic member designed to deform in response to a change in pressure of the liquids in order to maintain the parallelism of the two transparent plates;

filing the internal volume with the two liquids; and crimping the cap onto the body with the interposition of a sealing member comprising a toric portion compressed between the cap and the intermediate piece and a skirt portion compressed between the first and second cylindrical side walls.

35. A lens assembly according to claim 1, wherein at least one of the transparent members comprises a fixed optical lens.

* * * * *

UNITED STATES PATENT AND TRADEMARK OFFICE
CERTIFICATE OF CORRECTION

PATENT NO. : 7,515,350 B2  Page 1 of 1
APPLICATION NO. : 11/284125
DATED : April 7, 2009
INVENTOR(S) : Bruno Berge et al.

It is certified that error appears in the above-identified patent and that said Letters Patent is hereby corrected as shown below:

On the Cover Page, item (75) Inventors, the city "Lyons" should be --Lyon--.

On the Cover Page, item (73) Assignee, the city "Lyons" should be --Lyon--.

In Claim 5, column 8, line 64, the word "toxic" should be --toric--.

Signed and Sealed this

Sixteenth Day of June, 2009

JOHN DOLL
*Acting Director of the United States Patent and Trademark Office*